(12) United States Patent
Sixel et al.

(10) Patent No.: US 10,337,460 B2
(45) Date of Patent: Jul. 2, 2019

(54) METHOD FOR OPERATING AN ENGINE

(71) Applicant: Caterpillar Motoren GmbH & Co. KG, Kiel (DE)

(72) Inventors: Eike Joachim Sixel, Kiel (DE);
Andreas Banck, Altenholz (DE);
Michael Sturm, Neuwittenbek (DE);
Carsten Rickert, Kiel (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 241 days.

(21) Appl. No.: 15/369,314

(22) Filed: Dec. 5, 2016

(65) Prior Publication Data

US 2017/0159612 A1    Jun. 8, 2017

(51) Int. Cl.
| | | |
|---|---|---|
| *F02B 23/00* | (2006.01) | |
| *F02M 23/06* | (2006.01) | |
| *F02D 23/00* | (2006.01) | |
| *F02D 33/02* | (2006.01) | |
| *F02D 41/10* | (2006.01) | |
| *F02B 21/00* | (2006.01) | |
| *F02D 19/02* | (2006.01) | |
| *F02D 19/10* | (2006.01) | |
| *F02D 21/10* | (2006.01) | |
| *F02D 41/00* | (2006.01) | |

(52) U.S. Cl.
CPC ............ *F02M 23/06* (2013.01); *F02B 21/00* (2013.01); *F02D 19/023* (2013.01); *F02D 19/10* (2013.01); *F02D 21/10* (2013.01); *F02D 23/00* (2013.01); *F02D 33/02* (2013.01); *F02D 41/0007* (2013.01); *F02D 41/0025* (2013.01); *F02D 41/10* (2013.01); *F02D 41/0027* (2013.01)

(58) Field of Classification Search
CPC ......... Y02T 10/36; Y02T 10/32; Y02T 10/42; Y02T 10/121; F02D 41/0027
USPC ................... 123/585, 299, 435, 445; 701/104
See application file for complete search history.

(56) References Cited

U.S. PATENT DOCUMENTS

| | | | |
|---|---|---|---|
| 3,866,588 A | | 2/1975 | Nakada et al. |
| 4,287,862 A | * | 9/1981 | Noguchi .................. F02B 5/00 |
| | | | 123/146.5 A |
| 4,864,991 A | | 9/1989 | Snyder et al. |
| | | (Continued) | |

FOREIGN PATENT DOCUMENTS

| | | |
|---|---|---|
| CN | 1465851 | 1/2004 |
| DE | 102004037971 | 2/2006 |
| | (Continued) | |

OTHER PUBLICATIONS

Search Report dated Jun. 6, 2016, issued in GB 1521586.6 (1 page).

*Primary Examiner* — Marguerite J McMahon
*Assistant Examiner* — James J Kim

(57) ABSTRACT

A method for operating an engine is disclosed. The method may include supplying air from a primary air supply unit to an intake conduit. The method may also include supplying air to the engine from the intake conduit. The method may further include selectively supplying air from a secondary air supply unit to the intake conduit. In addition, the method may include maintaining an air fuel ratio between a first threshold value and a second threshold value during an increase in engine load increase by controlling a supply of air from the secondary supply unit to the intake conduit.

19 Claims, 4 Drawing Sheets

(56) References Cited

U.S. PATENT DOCUMENTS

| | | | |
|---|---|---|---|
| 6,032,650 A | 3/2000 | Rask | |
| 7,703,435 B2 * | 4/2010 | Surnilla | F02D 19/0628 123/27 GE |
| 8,805,606 B2 * | 8/2014 | Schaffeld | F02B 33/34 701/102 |
| 8,897,995 B2 | 11/2014 | Kurtz | |
| 2009/0199789 A1 | 8/2009 | Beard | |
| 2009/0217898 A1 | 9/2009 | Gokhale et al. | |
| 2010/0331143 A1 * | 12/2010 | Jager | B60W 10/02 477/167 |
| 2011/0288741 A1 * | 11/2011 | Schaffeld | F02B 33/34 701/102 |
| 2014/0238340 A1 * | 8/2014 | Dunn | F02M 43/00 123/299 |
| 2015/0167590 A1 | 6/2015 | zur Loye et al. | |
| 2015/0198083 A1 * | 7/2015 | Bandyopadhyay | F02D 13/0203 123/304 |
| 2015/0219027 A1 * | 8/2015 | zur Loye | F02D 41/0027 60/603 |
| 2015/0241306 A1 * | 8/2015 | Sixel | G01M 15/08 123/435 |
| 2015/0308366 A1 * | 10/2015 | Melnyk | F02D 41/1454 123/299 |

FOREIGN PATENT DOCUMENTS

| | | |
|---|---|---|
| EP | 2811136 | 12/2014 |
| EP | 2604830 B1 | 2/2015 |
| EP | 2853713 A2 | 4/2015 |
| GB | 1567552 | 5/1980 |
| JP | 4415779 | 11/2005 |
| WO | WO 2008/135715 A1 | 11/2008 |
| WO | WO 2011/064607 A1 | 6/2011 |
| WO | 2015154051 | 10/2015 |

* cited by examiner

METHOD FOR OPERATING AN ENGINE

CLAIM FOR PRIORITY

This application claims benefit of priority of European Patent Application No. 1521586.6, filed Dec. 8, 2015, which is incorporated herein by reference.

TECHNICAL FIELD

The present disclosure relates to the field of an engine. In particular, the present disclosure relates to a system and method of operating an engine burning a homogenous air fuel mixture during increase in engine load.

BACKGROUND

Internal combustion engines often experience sudden increase in loads during operation. An engine controller may increase the amount of fuel supplied to the engine during such transient loads in order to maintain engine speed. However, for gaseous fuel engines that burn a homogenous air fuel mixture the rate of increase of fuel supplied to the engine is limited by the rate of increase of air supplied to the combustion and is thereby limited by the rate of increase of intake manifold air pressure of the engine. The engine having a turbocharger may increase the intake manifold air pressure by controlling a compressor. However, the compressor generally takes some time to increase the air pressure due to inherent time needed to increase the speed of the compressor. This may result in a power lag until the air flow increases to the requisite level.

One approach for quickly increasing the intake manifold air pressure is by using an additional air storage unit to provide additional compressed air. This reduces the time needed for increasing power of the engine during sudden load increase. However, additional compressed air introduced in the engine may cause a leaner air fuel ratio which may result in misfiring or improper combustion in the engine.

U.S. Pat. No. 4,864,991 discloses a method for controlling air to gas ratio for a gaseous fuel engine. The method describes increasing the supply of gas and decreases supply of air to have a rich air gas mixture when there is a sudden increase in engine load.

SUMMARY OF THE INVENTION

According to an aspect, a method for operating an engine is disclosed. The engine includes an intake conduit configured to supply air to the engine, a primary air supply unit configured to supply air to the intake conduit, and a secondary air supply unit configured to selectively supply air to the intake conduit. The method discloses selectively controlling supply of air from the secondary air supply unit to the intake conduit such that air fuel ratio is maintained between a first threshold value and second threshold value during engine load increase.

According to another aspect, an engine is disclosed. The engine includes a primary air supply unit configured to supply air to an intake conduit, and a secondary air supply unit configured to selectively supply air to the intake conduit. The engine further includes a controller configured for increasing supply of fuel during increased engine load. The controller is further configured for selectively controlling supply of air from the secondary air supply unit in the intake conduit such that the air fuel ratio is maintained between a first threshold value and second threshold value during an engine load increase.

DETAILED DESCRIPTION

Figure 1:
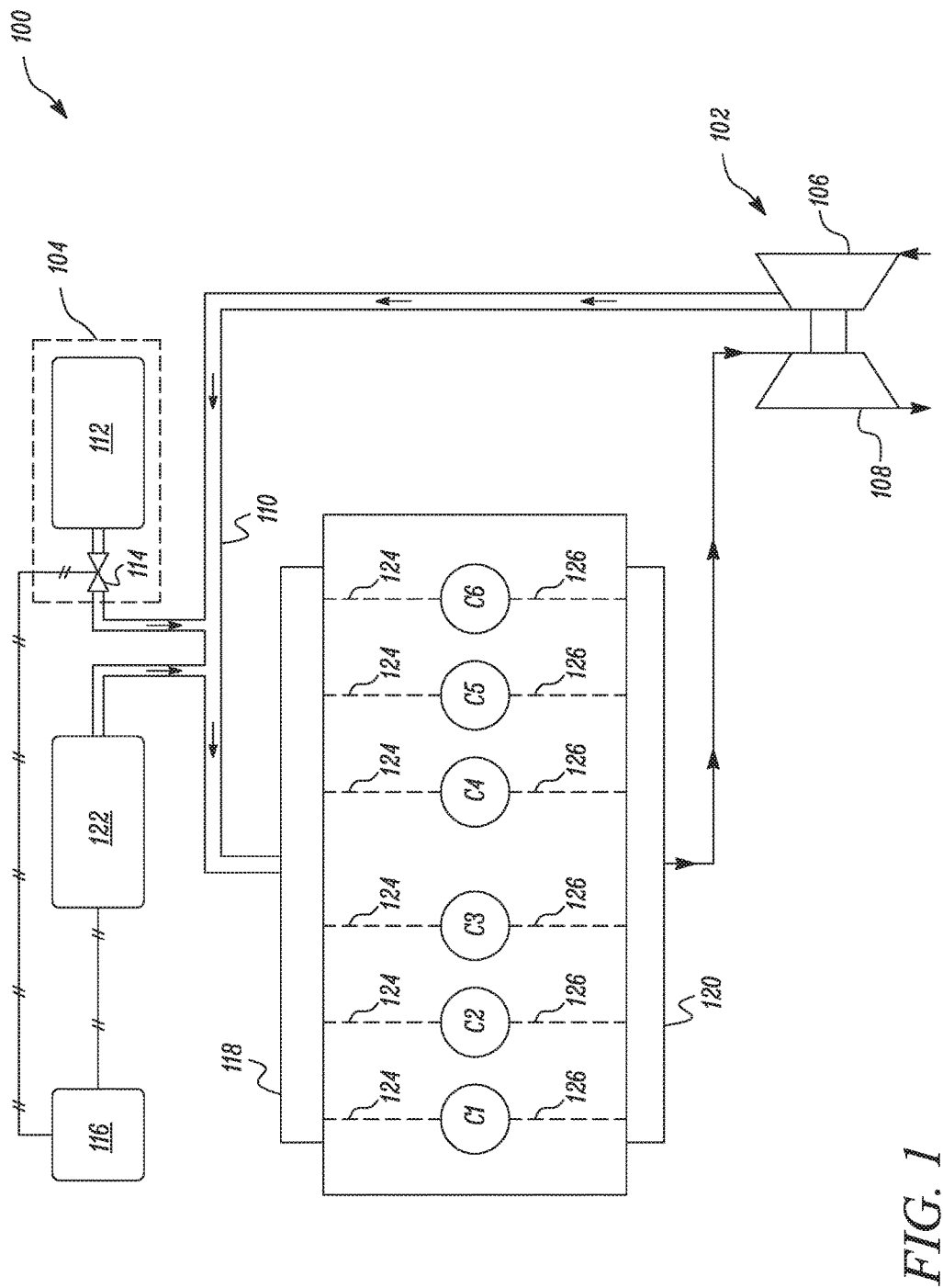
FIG. 1 illustrates an engine in accordance with an embodiment.

Referring to FIG. 1, there is shown an embodiment of engine 100 including a primary air supply unit 102 and a secondary air supply unit 104. The engine 100 may be a gasoline engine, a gaseous engine (shown in FIG. 1), or a dual fuel engine. The gaseous engine may use natural gas, propane gas, methane gas or any other gaseous fuel suitable for use in the gaseous engine. The engine 100 may be a single cylinder or a multi cylinder engine. The engine 100 may be operated by burning a homogeneous charge air fuel mixture. Although, engine 100 may be a gaseous engine burning for example natural gas, the disclosure may be applied to any engine that burns any type of fuel as a substantially homogenous air fuel mixture in the combustion chambers by using Otto cycle.

As shown in FIG. 1, the primary air supply unit 102 is a turbocharger having a compressor 106 and a turbine 108. The compressor 106 is driven by the turbine 108 and provides compressed air to the intake conduit 110. The turbine 108 is driven by exhaust gases. In another embodiment, the primary air supply unit 102 may be a supercharger. Further, it may be envisioned that the primary air supply unit 102 may be any other source of air configured to permanently supply air for operation of the engine 100.

The secondary air supply unit 104 is configured to selectively introduce air to the intake conduit 110 in addition to the air supplied by the primary air supply unit 102. The secondary air supply unit 104 may provide air to the intake conduit 110 when load is increased on the engine 100. The secondary air supply unit 104 may include an air reservoir 112 and a valve 114. The air reservoir 112 may be configured to store compressed air. The compressed air is provided to the air reservoir 112 by a compressor (not shown). Although, the recharging the air reservoir 112 by compressor is contemplated, other means known to one skilled in art would also apply.

The amount of compressed air introduced in the intake conduit 110 from the air reservoir 112 is controlled by controlling the actuation and opening of the valve 114. The valve 114 may be a solenoid actuated valve and controlled by a controller 116. Although a solenoid actuated valve is contemplated, other types of valves such as a hydraulically actuated valve, a pneumatically actuated valve etc. known to one skilled in the art would also apply. In an embodiment, the controller 116 may be an electronic control module (ECM). In another embodiment, the valve 114 may be controlled by an independent controller.

The controller 116 may include a non-transient computer readable storage media (not shown) including code for enabling monitoring and control of the engine 100. The controller 116 may be configured to receive signals from a variety of engine sensors, as further elaborated herein, in order to determine operating parameters and operating conditions, and correspondingly adjust various engine actuators to control operation of the engine 100. For example, the controller 116 may receive signals from various engine sensors including, but not limited to, engine speed, engine load, intake manifold air pressure, air reservoir pressure, exhaust pressure, ambient pressure, exhaust temperature, etc. Correspondingly, the controller 116 may send a signal to the valve 114 to inject compressed air from the air reservoir 112 into the intake conduit 110 based on communication from engine sensors within the engine system indicating increase in the engine load.

Further, the controller 116 may be configured to increase supply of fuel to the intake conduit 110 based on the increase in the engine load. In an embodiment, the controller 116 may control the valve 114 to supply air to the intake conduit 110 after increasing the supply of the fuel. In an embodiment, the controller 116 may simultaneously control introduction of air from the secondary air supply unit 104 in addition to the air supplied by the primary air supply unit 102 and increase supply of the fuel to the intake conduit 110. The controller 116 controls the supply of air from the secondary air supply unit 104 during engine load increase such that the air fuel ratio is maintained between a first threshold value and a second threshold value. The first threshold value of the air fuel ratio corresponds to a rich limit of the air fuel ratio. Similarly, the second threshold value of the air fuel ratio corresponds to a lean limit of the air fuel ratio.

In an embodiment, the air fuel ratio in the intake conduit 110 is monitored by the controller 116 by determining mass or volume of air and mass or volume of fuel introduced in the intake conduit 110. The controller 116 may estimate mass of air based on the engine load, engine speed, pressure and temperature of air in the intake conduit 110. Further, the controller 116 may determine the amount of fuel in the intake conduit 110 by using sensors generally known in the art. In an embodiment, the controller 116 may determine air fuel ratio by using an air fuel sensor positioned in the intake conduit 110.

Again referring to FIG. 1, the engine 100 may also include an intake manifold 118, an exhaust manifold 120, and a fuel supply system 122. The intake manifold 118 and the exhaust manifold 120 are each fluidly coupled with a plurality of cylinders C1 through C6, as indicated schematically by dashed lines 124 and 126, respectively. In the embodiment shown, a single intake manifold 118 and exhaust manifold 120 are fluidly coupled with cylinders C1 through C6. However, it is also possible to configure the intake manifold 118 and/or the exhaust manifold 120 as a split or multiple-piece manifold, each associated with a different group of cylinders.

The fuel supply system 122 is configured to provide fuel to the intake conduit 110 or directly to cylinders C1 to C6. The fuel may be a gaseous fuel such as natural gas, propane gas, methane gas, gasoline, diesel or any other suitable fuel. The fuel supply system 122 may include a fuel storage container, one or more fuel pumps, one or more valves to control amount of fuel. In the present embodiment, as the engine 100 is Otto cycle based gaseous engine, the fuel supply system 122 provides gaseous fuel to the intake conduit 110.

Figure 2:
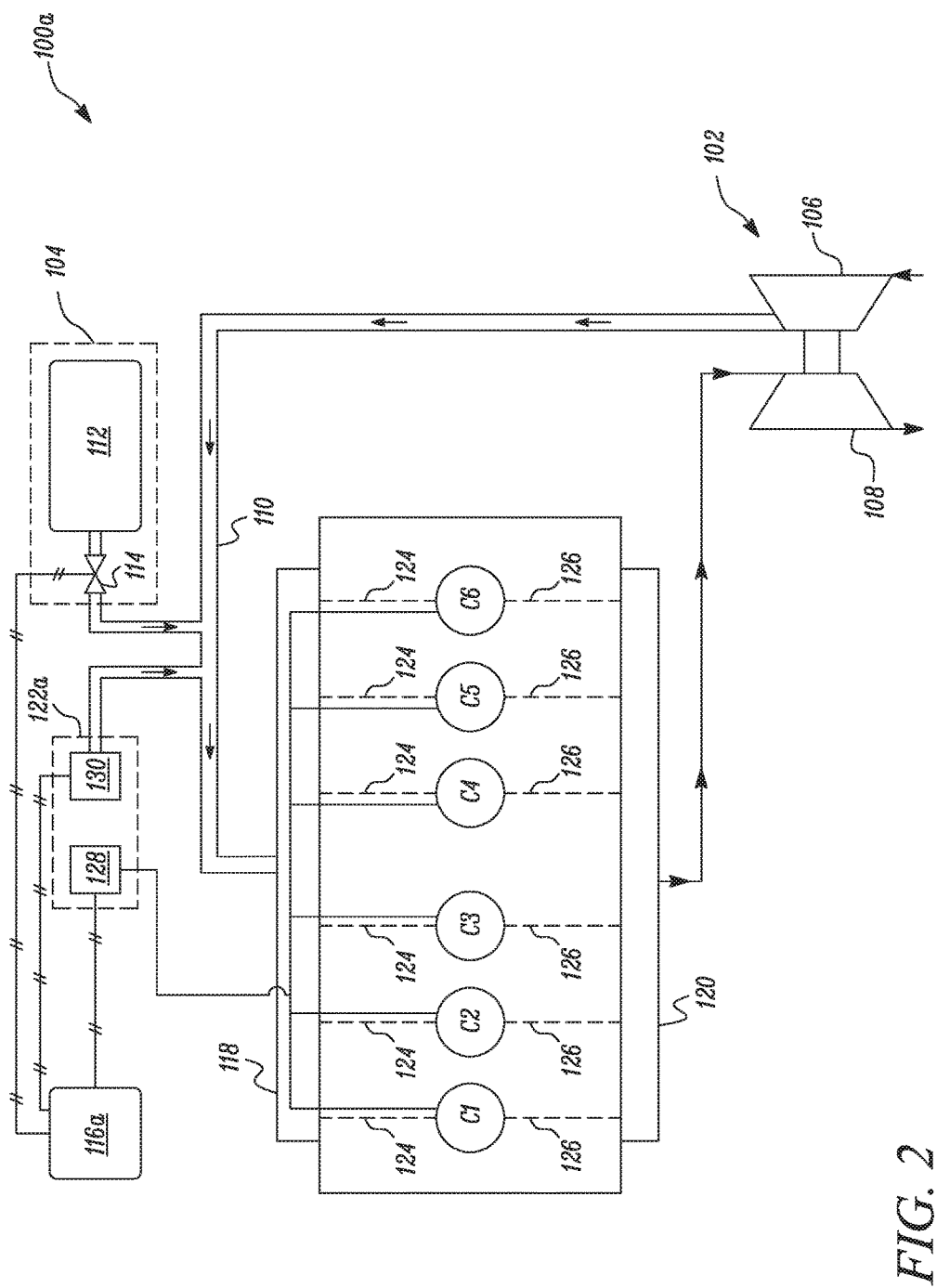
FIG. 2 illustrates an alternative engine in accordance with an embodiment.

Referring to FIG. 2, there is shown an alternative embodiment of an engine 100a. The engine 100a is a duel fuel engine. The engine 100a may include the primary air supply unit 102, the secondary air supply unit 104, a fuel supply system 122a, the intake conduit 110, the intake manifold 118, the exhaust manifold 120, cylinders C1 to C6, and a controller 116a.

The fuel supply system 122a includes a liquid fuel supply unit 128 and a gaseous fuel supply unit 130. The liquid fuel supply unit 128 is configured to supply liquid fuel to the cylinders C1 to C6. The liquid fuel may be a diesel fuel. The gaseous fuel supply unit 130 is configured to supply gaseous fuel to the intake conduit 110. The gaseous fuel may be a natural gas, propane gas, methane gas or any other gaseous fuel suitable for use in the engine 100a. The supply of the gaseous fuel, the liquid fuel, and air from the gaseous fuel supply unit 130, the liquid fuel supply unit 128, and the secondary air supply unit 104 respectively may be controlled by the controller 116a.

The controller 116a may include a non-transient computer readable storage media (not shown) including code for enabling monitoring and control of the engine 100a. The controller 116a may be configured to receive signals from a variety of engine sensors, as further elaborated herein, in order to determine operating parameters and operating conditions, and correspondingly adjust various engine actuators to control operation of the engine 100a. For example, the controller 116a may receive signals from various engine sensors including, but not limited to, engine speed, engine load, intake manifold air pressure, air reservoir pressure, exhaust pressure, ambient pressure, exhaust temperature, accelerator pedal, throttle valve etc. Correspondingly, the controller 116a may send a signal to the valve 114 to inject air from the air reservoir 112 into the intake conduit 110 based on communication from engine sensors within the engine system indicating increase in the engine load.

The controller 116a is configured to increase supply of gaseous fuel to the intake conduit 110 when there is an increase in the engine load. After increasing the supply of gaseous fuel, the controller 116a controls supply of air from the secondary air supply unit 104 to the intake conduit 110 in addition to the air supplied by the primary air supply unit 102. The actuation and opening of the valve 114 of the secondary air supply unit 104 is controlled by the controller 116a to control the amount of air supplied to the intake conduit 110. In an embodiment, the controller 116a may simultaneously increase the supply of gaseous fuel and supply of the air from the secondary air supply unit 104 to the intake conduit 110. The actuation and opening of the valve 114 of the secondary air supply unit 104 is controlled by the controller 116a to control the amount of air supplied to the intake conduit 110. The controller 116a is configured to control the amount of air introduced in the intake conduit 110 from the secondary air supply unit 104 such that air fuel ratio is maintained between a first threshold value and a second threshold value. The first threshold value corresponds to rich limit for air and gaseous fuel mixture. Similarly, the second threshold value corresponds to a lean limit for air and gaseous fuel mixture.

Further, the controller 116a is configured to supply the liquid fuel in the cylinders C1 to C6 when the air fuel ratio of the air and gas mixture reaches to the first threshold value to keep engine operation at the desired engine operating curve. In an embodiment, when the air fuel ratio of the air and gaseous mixture reaches the first threshold value and the engine power remains less than the required engine power corresponding to the engine load, the controller 116a increases supply of the liquid fuel to the cylinders C1 to C6. The supply of liquid fuel directly to the cylinders C1 to C6 causes quickly increasing engine power thereby engine 100a may respond to the increased engine load quickly.

The controller 116a may monitor the air fuel ratio in the intake conduit 110 by determining mass or volume of air and mass or volume of fuel introduced in the intake conduit 110. The controller 116a may estimate mass of air based on the engine load, engine speed, pressure and temperature of air in the intake conduit 110. Further, the controller 116a may determine the amount of fuel introduced in the intake conduit 110 by using sensors generally known in the art. In an embodiment, the controller 116a may determine air fuel ratio by using an air fuel sensor positioned in the intake conduit 110.

INDUSTRIAL APPLICABILITY

The present disclosure provides for the secondary air supply unit 104 for the engine 100 and 100a that selectively supply air to the intake conduit 110 in addition to the air supplied by the primary air supply unit 102 to quickly increase engine power during increase engine loads. Also, the controller 116 and 116a facilitates introduction of air from the secondary air supply unit 104 such that the air fuel ratio is maintained between the fresh threshold value and the second threshold value.

Figure 3:
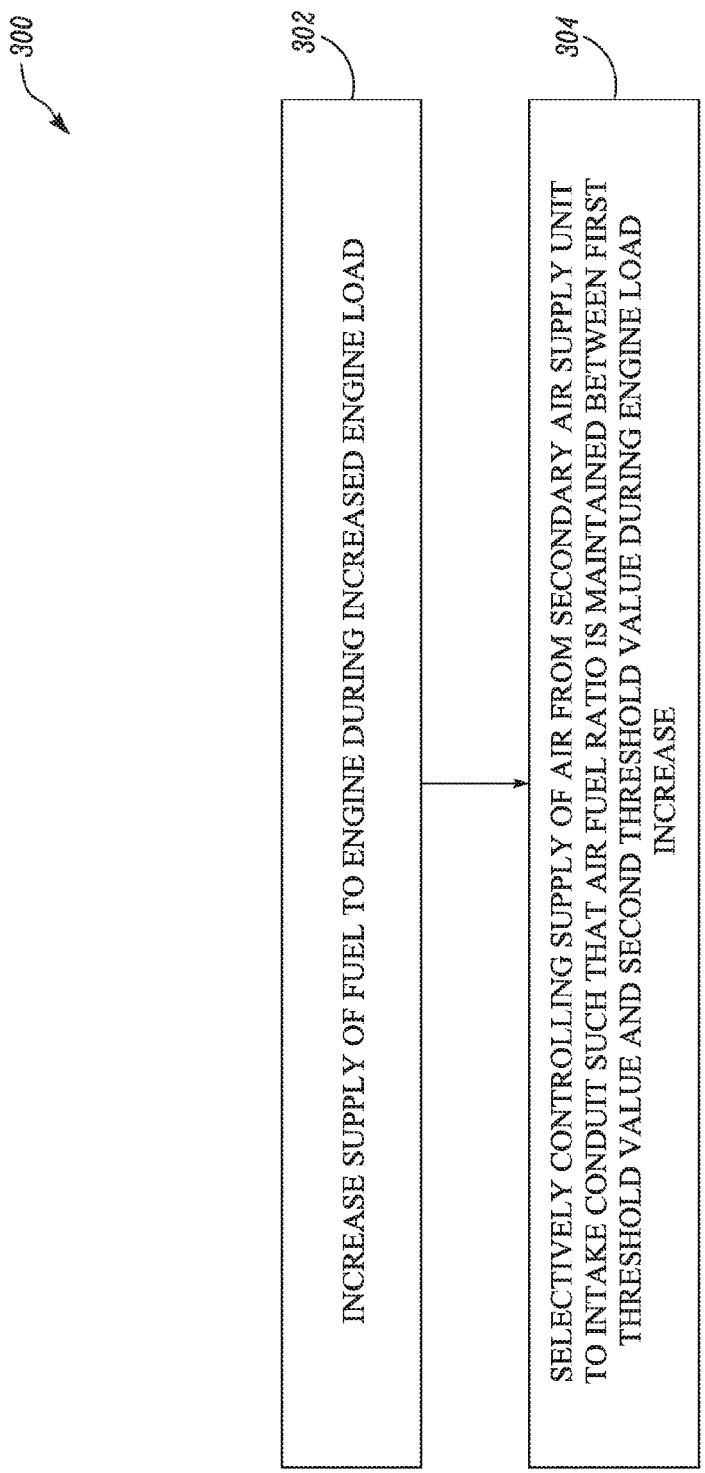
FIG. 3 illustrates a method for operating the engine in accordance with an embodiment.

Further, the present disclosure provides for a method 300 for operating the engine 100 in accordance with an embodiment of the disclosure. Referring to FIG. 3, the method 300 includes a step 302 in which supply of fuel is increased when engine load increases to keep the engine speed constant. The fuel is supplied from the fuel supply system 122. The increase in engine load may be determined by monitoring engine speed or any other engine parameter known in the art.

The method 300 further includes a step 304 in which introduction of the air from the secondary air supply unit 104 to the intake conduit 110 is controlled such that the air fuel ratio is maintained between the first threshold value and the second threshold value. The introduction of the air from the secondary air supply unit 104 may be controlled by controlling the valve 114. In an embodiment, the valve may be a solenoid actuated valve. In an embodiment, the air from the secondary air supply unit 104 is supplied to the intake conduit 110 simultaneously to the increase in the fuel supply to the intake conduit 110. In another embodiment, the air from the secondary air supply unit 104 is supplied after increasing the supply of the fuel.

In yet another embodiment, introduction of the air from the secondary air supply unit 104 to the intake conduit 110 is initiated when the air fuel ratio is equal to or above the first threshold value after increasing the supply of the fuel. Thereafter, the air fuel ratio is monitored in the intake conduit 110 and the supply of the air from the secondary air supply unit 104 is stopped when the air fuel ratio is equal to or less than the second threshold value. Thereby, the air fuel ratio is maintained between the first threshold value and the second threshold value by selectively controlling supply of air from the secondary air supply unit 104 to the intake conduit 110 after increasing the supply of fuel. The supply of fuel is increased corresponding to increase in the engine load such that the engine power is increased to accept the increased engine load. Further, the introduction of the air from the secondary air supply unit 104 facilitates quick increase in engine power by quickly supplying additional air. Also, as the air fuel ratio is maintained between the rich limit and the lean limit, knocking and misfiring is also minimized.

Figure 4:
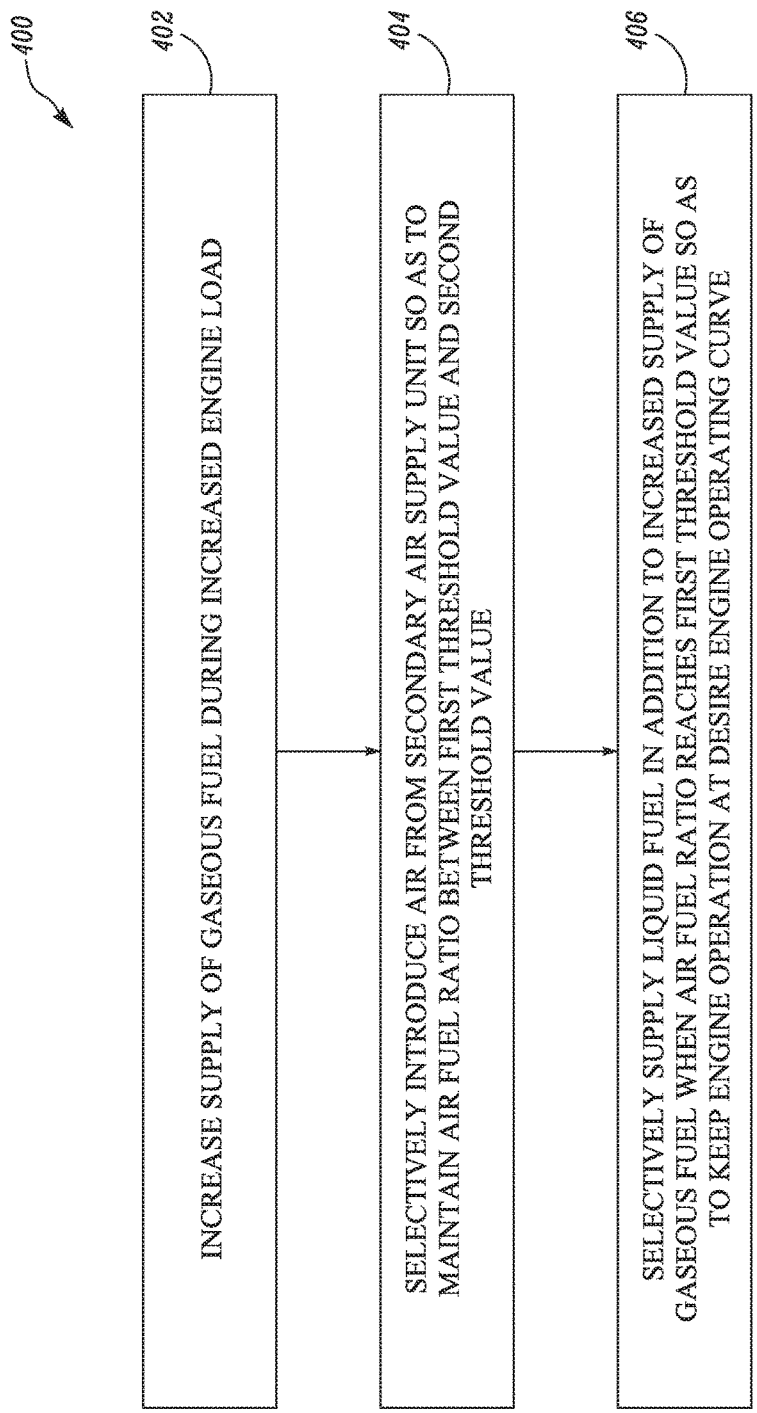
FIG. 4 illustrates a method for operating the alternative engine in accordance with an embodiment.

Furthermore, the present disclosure provides for a method 400 for operating the engine 100a in accordance with an alternative embodiment of the disclosure. Referring to FIG. 4, the method 400 includes a step 402 in which supply of gaseous fuel is increased when engine load increases. The gaseous fuel is supplied from the gaseous fuel supply unit 130. The increase in engine load may be determined by monitoring engine speed, pressing of acceleration pedal or any other engine parameter known in the art.

The method 400 further includes a step 404 in which introduction of the air from the secondary air supply unit 104 to the intake conduit 110 is controlled such that the air and gaseous fuel ratio is maintained between the first threshold value and the second threshold value during increase in engine load. The introduction of the air from the secondary air supply unit 104 may be controlled by controlling the valve 114. In an embodiment, the valve 114 may be a solenoid actuated valve. In an embodiment, the air from the secondary air supply unit 104 is supplied to the intake conduit 110 simultaneously to the increase in the gaseous fuel supply to the intake conduit 110. In another embodiment, the air from the secondary air supply unit 104 is supplied after increasing the supply of the gaseous fuel.

In yet another embodiment, introduction of the air from the secondary air supply unit 104 to the intake conduit 110 is initiated when the air and gaseous fuel ratio is equal to or above the first threshold value after increasing the supply of the gaseous fuel. Thereafter, the air and gaseous fuel ratio is monitored in the intake conduit 110 and the supply of the air from the secondary air supply unit 104 is stopped when the air and gaseous fuel ratio is equal to or less than the second threshold value. Thereby, the air and gaseous fuel ratio is maintained between the first threshold value and the second threshold value by selectively controlling supply of air from the secondary supply unit 104 to the intake conduit 110 after increasing the supply of gaseous fuel.

The supply of gaseous fuel is increased corresponding to increase in the engine load such that the engine power is increased to accept the increased engine load. The method 400 further includes a step 406 in which liquid fuel is introduced in the cylinder C1 to C6 after increasing the supply of gaseous fuel when the air fuel ratio of the air and gas mixture reaches to the first threshold value so as to keep the engine operation at desired engine operating curve. The engine operating curve refers to a curve between engine speed and engine torque. In an embodiment, when the air fuel ratio of the air and gaseous mixture reaches to the first threshold value and the engine power remains less than the required engine power corresponding to the engine load, the controller 116a may increase supply of the liquid fuel from the liquid fuel supply unit 128 to the cylinders C1 to C6.

In an exemplary embodiment, when a machine starts uphill, an operator presses an accelerator pedal to keep machine speed same as that of the speed of machine on a flat path thereby increasing engine load. In this case, the controller 116a may increases the supply of the gaseous fuel and introduce additional air from the secondary supply unit 104 to the intake conduit 110. Additional air is introduced such that the air fuel ratio is between the first threshold value and the second threshold value. Further, when the air fuel ratio reaches to the first threshold value and the secondary air supply unit 104 is not able to supply air quickly to increase the engine power corresponding to the increased engine load, the controller 116a supply liquid fuel to the cylinders C1 to C6 to increase engine power quickly.

Thereby, the engine 100a responds to increased engine load by utilizing maximum amount of gaseous fuel rather than switching to purely liquid fuel mode. Further, as additional air may be supplied quickly from the secondary supply unit 104 and the liquid fuel is supplied directly to the cylinders C1 to C6, the engine 100*a* increases the engine power in a short time duration. This helps in reducing the time lag in responding to the sudden increase in the engine load. Further, as the air fuel ration is always maintained between a rich limit and a lean limit, the chances of knocking and misfiring is decreased when the engine 100*a* is increasing the engine power corresponding to the increase in the engine load.

What is claimed is:

1. A method for operating an engine, comprising:
    supplying air from a primary air supply unit to an intake conduit;
    supplying air to the engine from the intake conduit;
    increasing a supply of gaseous fuel to the engine during an increase in engine load;
    selectively supplying air from a secondary air supply unit to the intake conduit; and
    maintaining an air fuel ratio between a first threshold value and a second threshold value during the increase in engine load by controlling a supply of air from the secondary supply unit to the intake conduit, and
    selectively supplying liquid fuel in addition to the increased supply of gaseous fuel when the air fuel ratio reaches the first threshold value.

2. The method of claim 1, wherein supplying the air from the primary air supply unit includes supplying the air using a compressor.

3. The method of claim 1, wherein supplying the air from the secondary air supply unit includes supplying the air from an air reservoir.

4. The method of claim 1, further including operating a solenoid actuated valve to control an amount of the air supplied from the secondary air supply unit.

5. The method of claim 4, wherein operating the solenoid actuated valve includes controlling the solenoid actuated valve using a controller.

6. The method of claim 5, wherein the controller is an electronic control module of the engine.

7. The method of claim 1, wherein the engine is a gaseous engine.

8. The method of claim 1, wherein the engine is a dual fuel engine.

9. The method of claim 1, further including increasing a supply of fuel corresponding to the increase in the engine load.

10. The method of claim 1, further including operating the engine based on an Otto cycle.

11. An engine, comprising:
    a primary air supply unit configured to supply air permanently to an intake conduit;
    a secondary air supply unit configured to selectively supply air to the intake conduit; and
    a controller configured for:
        increasing a supply of gaseous fuel to the engine during an engine load increase;
        selectively controlling a supply of air from the secondary air supply unit in the intake conduit such that an air fuel ratio is maintained between a first threshold value and a second threshold value during the engine load increase; and
        selectively supplying liquid fuel to the engine when the air fuel ratio reaches the first threshold value.

12. The engine of claim 11, wherein the engine comprises a solenoid actuated valve to control the air from the secondary air supply unit to the intake conduit.

13. The engine of claim 11, wherein the engine comprises multiple cylinders and a valve to supply the air from the secondary air supply unit for each of the cylinders.

14. The engine of claim 11, wherein the primary air supply unit includes a compressor.

15. The engine of claim 11, wherein the secondary air supply unit includes an air reservoir.

16. The engine of claim 11, wherein the engine is a gaseous engine.

17. The engine of claim 11, wherein the engine is an Otto cycle based engine.

18. The engine of claim 11, wherein the supply of fuel is increased corresponding to the increase in the engine load.

19. The engine of claim 11, wherein the controller is an electronic control module of the engine.

* * * * *